Patented Jan. 2, 1951

2,536,659

UNITED STATES PATENT OFFICE 2,536,659

NITROCELLULOSE COMPATIBLE PENTAERYTHRITOL ESTERS

Alfred E. Rheineck, Wilmington, Del., assignor to Hercules Powder Company, Wilmington, Del., a corporation of Delaware Application May 13, 1950, Serial No. 161,857

12 Claims. (Cl. 260—104)

This invention relates to esters of a pentaerythritol and a rosin acid and methods for producing the same.

It is known to produce esters of pentaerythritol and a rosin acid. Such esters are characterized by great hardness, clarity and high melting point, see U. S. 1,820,265 to Leavitt N. Bent and Alan C. Johnston. In some respects these esters constitute an improvement over esters derived from glycerol and a rosin acid. It is also known to use such esters in the preparation of oleoresinous varnishes and in lacquers. However, despite the fact that the pentaerythritol esters contribute desirable properties to such compositions, it is well known that the pentaerythritol esters of rosin have an objectionable characteristic when used in nitrocellulose lacquer formulations. The coatings or films resulting from such compositions evidence incompatibility of the ingredients which is variously described as seediness, graininess or haziness.

Seediness or graininess can be observed by viewing in the direction of a source of light a dried film held horizontally at near eye level. The phenomenon is manifested as small specks spread uniformly throughout the film. Haziness may be observed by viewing the film against a dark background and is manifested as a smoky or milky condition.

Figure 1:
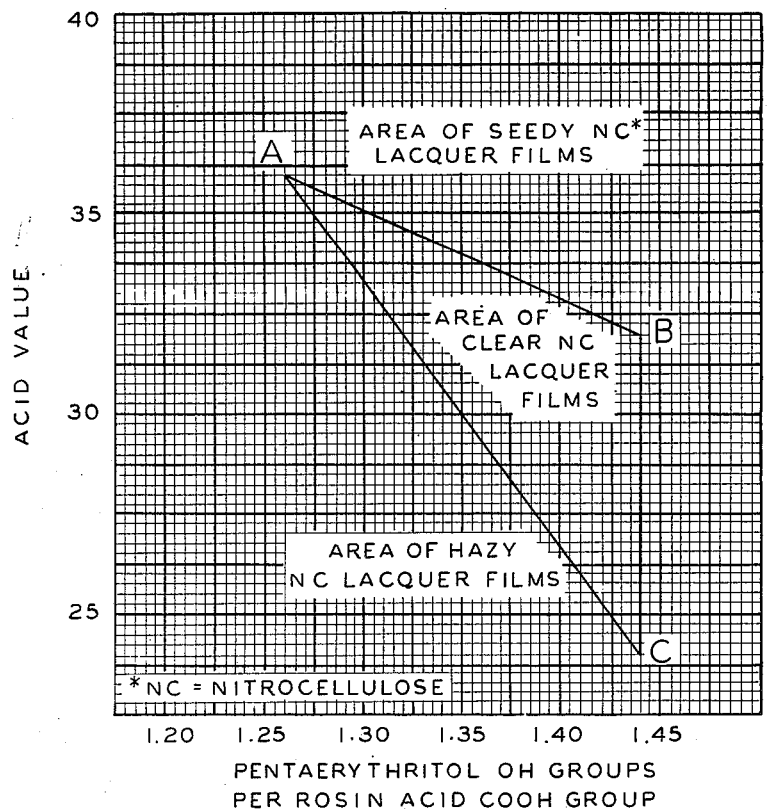
Figure 1:
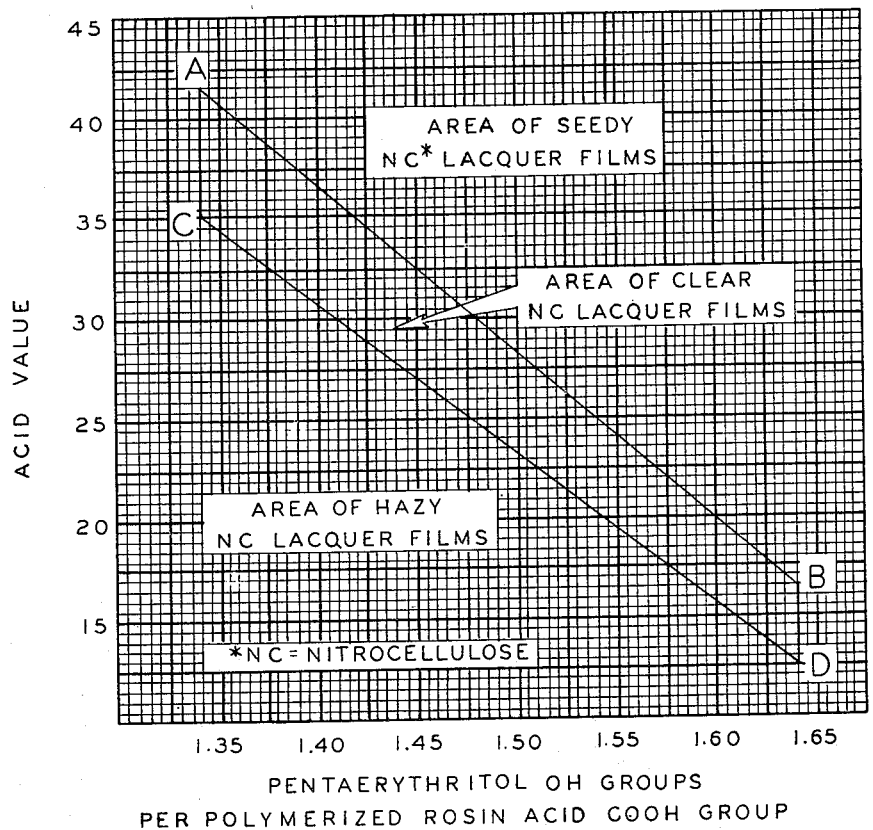

In accordance with this invention it has been found that hard resinous esters can be prepared from a pentaerythritol and a rosin acid material which are truly compatible with nitrocellulose and which may be used in nitrocellulose lacquer formulations to provide perfectly clear lacquer films. Such esters are prepared by employing in the esterification reaction an excess of pentaerythritol over and above that theoretically required for complete esterification of the rosin acid material employed. More specifically, such an amount of pentaerythritol is employed as to provide from 1.26 to 1.44 hydroxyl groups for each rosin acid carboxyl group. To obtain the desired esters, the esterification reaction is stopped at a point such that the acid value of the finished ester is within a certain acid number range as defined by the area ABC of Figure 1. As will be seen from an inspection of Figure 1, the acid number range is variable and dependent upon the particular excess of pentaerythritol employed. It has accordingly been found that nitrocellulose compatible esters of pentaerythritol and a rosin acid can be obtained by correlating the excess hydroxyl content with the acid value of the finished ester. The area ABC of Figure 1 defines these new esters having nitrocellulose compatibility.

Pentaerythritol is made commercially by the condensation of acetaldehyde and formaldehyde. Along with the pentaerythritol monomer formed, there are formed comparatively small amounts of related hydroxylated substances. One of these compounds, dipentaerythritol, is an ether having the following structure:

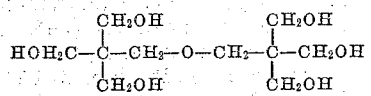

Another related compound, tripentaerythritol, is formed in even smaller amounts. According to the best evidence it is believed to have the following structural formula:

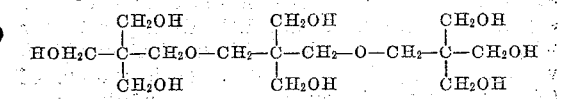

Dipentaerythritol, tripentaerythritol and higher ethers of pentaerythritol may be grouped together under the generic term "polypentaerythritols." This term is employed herein to mean those compounds having higher molecular weights than pentaerythritol monomer which are formed actually or theoretically by etherifying one or more of the hydroxyl groups of pentaerythritol monomer with other pentaerythritol molecules. The monomer, dimer, trimer, etc. of pentaerythritol refer to simple pentaerythritol, dipentaerythritol, and tripentaerythritol, respectively. The term "pentaerythritol" as used herein is used in a generic sense to include pentaerythritol monomer, polypentaerythritols and pentaerythritol monomer-polypentaerythritol mixtures.

In accordance with this invention, the pentaerythritol employed in making the desired resins may be pentaerythritol monomer, dipentaerythritol, tripentaerythritol, mixtures of polypentaerythritols or pentaerythritol monomer-polypentaerythritol mixtures. Preferably, the pentaerythritol employed will contain from 70 to 90% pentaerythritol monomer and will have a hydroxyl content of at least 42%. Included within this preferred classification are the technical or resin-grade pentaerythritols available commercially.

To determine the proper proportions of rosin acid material and a particular pentaerythritol to employ, it is desirable to first determine the hydroxyl content of the pentaerythritol by the acetylation method. The combining or equivalent weight of the pentaerythritol, i. e., that amount theoretically needed to completely esterify 1 mol of rosin acid, is given by the following formula:

Combining weight =
$$\frac{17 \times 100}{\text{Per cent hydroxyl content of pentaerythritol}}$$

The amount of pentaerythritol required for 1 mol of rosin acid to provide the desired number of pentaerythritol hydroxyl groups per rosin acid carboxyl group can be obtained by multiplying the combining weight of the pentaerythritol by the desired number.

Having now indicated in a general way the nature and purpose of this invention, there follows a more detailed description of specific embodiments of the invention.

Example 1

|  | Parts |
|---|---|
| N wood rosin | 1006 |
| Pentaerythritol | 150 |

The wood rosin employed contained about 10% neutral bodies. Hence, the rosin acid content amounted to 906 parts or 3 mols. The pentaerythritol was a technical grade material containing about 83% pentaerythritol monomer and having a hydroxyl content of about 46.0%. The combining weight of the pentaerythritol was 37, and there were accordingly present 1.35 pentaerythritol hydroxyls for each rosin acid carboxyl group.

The rosin was heated to 200° C. at which time the pentaerythritol was added with mechanical agitation. The mass was heated to 280° C. over a period of 30 minutes and held there for 1 hour with continued agitation. Mechanical agitation was then discontinued and a gentle stream of $CO_2$ was passed through the mass while maintaining a temperature of 280° C. Samples were taken at intervals as esterification progressed. It was found that the ester samples having acid values of from 30 to 34 (determined using phenolphthalein indicator on the esters after they had cooled to room temperature) were compatible with ½ sec. R. S. nitrocellulose at ester to nitrocellulose ratios of from 1.5–1.0 to 4.0–1.0. Esters having an acid value above 34 were found to give seedy films with nitrocellulose whereas esters having an acid value below 30 were found to give hazy films with nitrocellulose.

Example 2

|  | Parts |
|---|---|
| N wood rosin | 1006 |
| Pentaerythritol | 160 |

The same types of rosin and pentaerythritol were employed as in Example 1. In this instance there were present, however, 1.44 pentaerythritol hydroxyls for each rosin acid carboxyl group. The method employed in esterifying the ingredients was identical with that of Example 1. It was found that the ester samples having acid values of from 24 to 32 were compatible with ½ sec. R. S. nitrocellulose at ester to nitrocellulose ratios of from 1.5–1.0 to 4.0–1.0. Esters having an acid value above 32 where found to give seedy films with nitrocellulose whereas esters having an acid value below 24 were found to give hazy films with nitrocellulose.

Example 3

|  | Parts |
|---|---|
| N wood rosin | 1006 |
| Pentaerythritol | 141 |

The rosin employed was the same as that of Example 1. The pentaerythritol was explosive grade (substantially entirely pentaerythritol monomer), having a hydroxyl content of 48.8. The combining weight of the pentaerythritol was 34.9 and there were accordingly 1.35 pentaerythritol hydroxyls for each rosin acid carboxyl group. Esterification was carried out as in Example 1 to obtain a resinous ester having an acid value of 33. This ester was entirely compatible with ½ sec. R. S. nitrocellulose at ester to nitrocellulose ratios of from 1.5–1.0 to 4.0–1.0.

Example 4

|  | Parts |
|---|---|
| N wood rosin | 1006 |
| Pentaerythritol | 151 |

The same types of ingredients as employed in Example 3 were used. This proportion, however, provided 1.44 pentaerythritol hydroxyls per rosin acid carboxyl group. The ingredients were esterified as in Example 1 to achieve a product having an acid value of 25. This ester was compatible with ½ sec. R. S. nitrocellulose at ester to nitrocellulose ratios of from 1.5–1.0 to 4.0–1.0.

Example 5

|  | Parts |
|---|---|
| N wood rosin | 1006 |
| Pentaerythritol | 151 |

The rosin employed was the same as used in previous examples. The pentaerythritol employed was composed of 33% dipentaerythritol and 67% pentaerythritol monomer. The dipentaerythritol had a hydroxyl value of 40.2 and a combining weight of 42.1, whereas the pentaerythritol monomer had a hydroxyl value of 48.8 and a combining weight of 34.9. This composite pentaerythritol accordingly provided 1.35 pentaerythritol hydroxyls per rosin acid carboxyl group. The ingredients were esterified as in Example 1 to achieve a product having an acid value of 31. This ester was compatible with ½ sec. R. S. nitrocellulose at ester to nitrocellulose ratios of from 1.5–1.0 to 4.0–1.0.

Example 6

|  | Parts |
|---|---|
| N wood rosin | 1006 |
| Pentaerythritol | 150 |

The N wood rosin was the same as that used in Example 1. The pentaerythritol was a technical grade pentaerythritol having a hydroxyl content of about 46.8% and containing about 85% pentaerythritol monomer. The combining weight of the pentaerythritol was 36.3, and there were accordingly present 1.35 pentaerythritol hydroxyls for each rosin acid carboxyl group. Esterification of these ingredients under conditions similar to those of Example 1 gave a product having an acid value of 32 which was compatible with ½ sec. R. S. nitrocellulose at ester to nitrocellulose ratios of from 1.5–1.0 to 4.0–1.0.

Example 7

|  | Parts |
|---|---|
| N wood rosin | 1006 |
| Pentaerythritol | 222 |

The N wood rosin was the same as that used in Example 1. The pentaerythritol was a mixture of polypentaerythritols, and had a hydroxyl content of 33%. The combining weight of the pentaerythritol was 51.3, and there were accordingly present 1.44 pentaerythritol hydroxyls for each rosin acid carboxyl group. Esterification of these ingredients was carried out under conditions similar to those of Example 1 to obtain a resin having an acid value of 29. It was found to be compatible with ½ sec. R. S. nitrocellulose at ester to nitrocellulose ratios of from 1.5–1.0 to 4.0–1.0.

Any rosin acid may be used in preparing the subject resinous esters. By the term "rosin acid material," there is meant not only the substantially pure rosin acids but also commercial wood and gum rosins from which the substantially pure rosin acids are obtainable. Commercial wood rosin usually contains about 10% of a nonacidic fraction known as neutral bodies. Commercial gum rosin also contains neutral bodies but usually in a somewhat lesser amount as compared with wood rosin. The term "rosin acid material" as used herein accordingly comprises substantially pure rosin acids and specific rosin acids obtainable therefrom as abietic, l-pimaric, d-pimaric, sapinic, etc. acids. The term also includes such substantially pure rosin acids, wood rosin or gum rosins which have been subjected to further treatment such as hydrogenation, dehydrogenation, disproportionation or heat-treatment. Of these various materials, wood or gum rosin is preferred since its use is economically advantageous and from the standpoint of producing a nitrocellulose compatible product is as effective as the others.

It is apparent from the examples that pentaerythritol monomer, dipentaerythritol, tripentaerythritol, mixtures of polypentaerythritols, or pentaerythritol monomer - polypentaerythritol mixtures may be employed in accordance with this invention. The preferred grade of pentaerythritol employed as a starting material is one containing from 70 to 90% pentaerythritol monomer and having a hydroxyl content of at least 42%. Included within this preferred classification are the so-called technical or resin grade pentaerythritols available commercially. Such technical or resin grade pentaerythritols frequently contain a small amount of metal compounds, the metal being introduced as catalyst or as impurities in the reactants. For the purpose of this invention it is preferred that the pentaerythritol employed be substantially free of such metal compounds, i. e., that the mineral ash content of the pentaerythritol, determined as the sulphate, be not greater than 0.30%.

The general method of esterification used in applying the principles of this invention is that known to the art for esterifying pentaerythritol and a rosin acid material. Thus, an esterification temperature of at least 250° C. should be used, and preferably a temperature of from 260° C. to 280° C. It is furthermore preferred, although not required, to heat the rosin acid material to a temperature of 190° C. to 210° C. prior to adding the pentaerythritol and then to raise the temperature of the ingredients to the desired esterification temperature as fast as possible. During esterification a gentle stream of inert gas such as $CO_2$, $N_2$, etc. may be passed through the reaction mixture. Heating is discontinued at a point such that the product after cooling to room temperature has an acid value (using phenolphthalein indicator) in the acid value compatibility range which applies for the particular ratio of pentaerythritol hydroxyl to rosin acid carboxyl groups employed, see Figure 1. During the period of cooling of the ester from the esterification temperature to room temperature the acid value may drop by as much as 10 points and the extent of this drop in acid value is dependent upon the conditions under which the cooling is effected.

During the esterification reaction some pentaerythritol and rosin acid material may be lost by distillation. Although these losses are slight, it is important to keep them at a very minimum. If the proportion of reactants originally employed is not maintained, it will be obvious that the acid value compatibility range as defined by Figure 1 will not obtain. To prevent such losses of ingredients or to keep such losses to a minimum, it is best not to sparge the resins during preparation. However, as illustrated by the examples, the use of a gentle stream of inert gas such as $N_2$, $CO_2$, etc. to agitate the ingredients may be advantageously employed. Losses of ingredients can also be minimized by maintaining considerable free space between the top of the reaction vessel and the surface of the reaction mixture or by employing a suitable condenser. In this manner water of esterification can be removed while retaining substantially all the reactants.

The resinous esters prepared in accordance with this invention are truly compatible with nitrocellulose in the ester to nitrocellulose ratios of from 1.5–1.0 to 4.0–1.0. Lacquers comprising the ingredients in these proportions deposit films which are perfectly clear and do not exhibit seediness, graininess or haziness. Generally speaking, the lacquers themselves are also perfectly clear. In some cases, a slight cloudiness or haziness can be detected in the lacquer. Even in these cases, however, the resulting films evidence complete compatibility of the esters and the nitrocellulose. Although in the examples the resins were tested for compatibility using ½ sec. R. S. nitrocellulose, the compatibility of the resins of this invention is not limited to compatibility with this particular type of nitrocellulose. The resins are compatible with the various types and grades of nitrocellulose used commercially in nitrocellulose formulations.

The resinous esters of this invention are also compatible with ethyl cellulose in weight ratios of from 1:3 to 3:1. The wide range of compatibility applies in particular for N-type ethyl cellulose having an ethoxyl content of from 46.8% to 48.5%. This compatibility characteristic is a unique property of the subject resinous esters since the prior art rosin esters of pentaerythritol are known to be incompatible with ethyl cellulose.

Where in the specification and claims reference is made to pentaerythritol monomer content of a pentaerythritol, it will be understood that determination by the dibenzal method is meant. This method involves the following steps. Prepare a benzaldehyde-methanol reagent by adding 100 ml. of anhydrous methanol to 20 ml. of benzaldehyde. Add 5 ml. of water to a dry sample of the pentaerythritol (0.35–0.55 grams) contained in an Erlenmeyer flask. Heat the 5 ml. solution to boiling, add 15 ml. of the benzaldehyde-methanol reagent and mix these solutions well. Add 12 ml. concentrated HCl and shake the reaction mixture. Allow the reaction mixture to stand for 5 minutes with occasional swirling while the greater part of the precipitate of pentaerythritol dibenzal forms and then place the flask in an ice bath for 1 hour. Dilute the reaction mixture with 25 ml. of ice cold methanol-water solution (1:1 by volume) and filter through a weighed fritted glass crucible. Wash the precipitate free of benzaldehyde with 100 ml. of methanol-water solution (1:1 by volume) at a temperature of 20-25° C. Dry the precipitate to constant weight at 120° C. (about 2 hours). The pentaerythritol monomer is calculated using the following formula in which 0.0269 represents a correction value for the solubility of the pentaerythritol dibenzal.

$$\frac{(\text{Grams precipitate} + 0.0269)\, 43.60}{\text{Grams sample}} =$$

Per cent pentaerythritol monomer

Where in the specification and claims reference is made to acid value, it will be understood that the phenolphthalein method for determining acid value is meant. This method involves the following steps. Dissolve about 3 grams of the resin in 15 ml. of toluene. Add 50 ml. of a neutral alcohol-benzene solution (1:1 by volume) and titrate the resulting solution with 0.5 N NaOH or KOH using phenolphthalein indicator to a permanent endpoint.

Where in the specification and claims reference is made to the hydroxyl value of a pentaerythritol, it will be understood that determination by the acetylation method is meant. This method involves the following steps. Prepare an acetic anhydride-pyridine solution by adding exactly 3.5 ml. water to 1000 ml. dry pyridine. After mixing, add 140 ml. acetic anhydride to make the reagent approximately 2.4 N. Weigh 0.5 to 0.6 gram of dry pentaerythritol into a 250 ml. Erlenmeyer flask. Add 25 ml. of the pyridine-acetic anhydride reagent from a constant delivery pipette. Attach the flask to a condenser and reflux gently for 30 minutes. Flush the condensers with 30-50 ml. of water, cool the flask for 20 min. in tap water to below 20° C. and titrate at once with 1.0 N NaOH using phenolphthalein indicator. Add the NaOH slowly (about 15-20 ml. per minute) until within 10 ml. of the endpoint and from then on add the NaOH dropwise. Determine the concentration of the pyridine-acetic anhydride reagent by making a blank determination on 25 ml. under the above conditions. The hydroxyl content is calculated using the following formula wherein A is the ml. NaOH used to titrate the blank, B is the ml. NaOH used to titrate the sample and N. F. is the normality factor of the NaOH:

$$\frac{1.7\,(A-B)\,\text{N.F.}}{\text{Grams sample}} = \text{Per cent hydroxyl}$$

All parts and percentages in the specification and claims are by weight unless otherwise mentioned.

What I claim and desire to protect by Letters Patent is:

1. A hard nitrocellulose compatible resinous ester derived from a pentaerythritol and a rosin acid material, the amount of said pentaerythritol employed in making the ester being sufficient to provide from 1.26 to 1.44 hydroxyl groups for each rosin acid carboxyl group, the ester having an acid value as defined by the area ABC of Figure 1.

2. A hard nitrocellulose compatible resinous ester derived from a pentaerythritol and a rosin acid material, said pentaerythritol being a pentaerythritol monomer-polypentaerythritol mixture containing from 70-90% pentaerythritol monomer and having a hydroxyl content of at least 42%, the amount of said pentaerythritol employed in making the ester being sufficient to provide from 1.26 to 1.44 hydroxyl groups for each rosin acid carboxyl group, the ester having an acid value as defined by the area ABC of Figure 1.

3. A hard nitrocellulose compatible resinous ester derived from a pentaerythritol and rosin, said pentaerythritol being a pentaerythritol monomer-polypentaerythritol mixture containing from 70-90% pentaerythritol monomer and having a hydroxyl content of at least 42%, the amount of said pentaerythritol employed in making the ester being sufficient to provide from 1.26 to 1.44 hydroxyl groups for each rosin acid carboxyl group, the ester having an acid value as defined by the area ABC of Figure 1.

4. A hard nitrocellulose compatible resinous ester derived from a pentaerythritol and wood rosin, said pentaerythritol being a pentaerythritol monomer-polypentaerythritol mixture containing from 70-90% pentaerythritol monomer and having a hydroxyl content of at least 42%, the amount of said pentaerythritol employed in making the ester being sufficient to provide from 1.26 to 1.44 hydroxyl groups for each rosin acid carboxyl group, the ester having an acid value as defined by the area ABC of Figure 1.

5. A hard nitrocellulose compatible resinous ester derived from a pentaerythritol and rosin, said pentaerythritol being a pentaerythritol monomer-polypentaerythritol mixture containing from 70-90% pentaerythritol monomer and having a hydroxyl content of at least 42%, the amount of said pentaerythritol employed in making the ester being sufficient to provide about 1.35 hydroxyl groups for each rosin acid carboxyl group, the ester having an acid value of from 30-34.

6. A hard nitrocellulose compatible resinous ester derived from a pentaerythritol and rosin, said pentaerythritol being a pentaerythritol monomer-polypentaerythritol mixture containing from 70-90% pentaerythritol monomer and having a hydroxyl content of at least 42%, the amount of said pentaerythritol employed in making the ester being sufficient to provide about 1.44 hydroxyl groups for each rosin acid carboxyl group, the ester having an acid value of from 24-32.

7. A hard nitrocellulose compatible resinous ester derived from pentaerythritol monomer and a rosin acid material, the amount of said pentaerythritol monomer employed in making the ester being sufficient to provide from 1.26 to 1.44 hydroxyl groups for each rosin acid carboxyl group, the ester having an acid value as defined by the area ABC of Figure 1.

8. A hard nitrocellulose compatible resinous ester derived from pentaerythritol monomer and rosin, the amount of said pentaerythritol monomer employed in making the ester being sufficient to provide from 1.26 to 1.44 hydroxyl groups for each rosin acid carboxyl group, the ester having an acid value as defined by the area ABC of Figure 1.

9. A hard nitrocellulose compatible resinous ester derived from a polypentaerythritol and a rosin acid material, the amount of said polypentaerythritol employed in making the ester being sufficient to provide from 1.26 to 1.44 hydroxyl groups for each rosin acid carboxyl group, the ester having an acid value as defined by the area ABC of Figure 1.

10. A hard nitrocellulose compatible resinous ester derived from a dipentaerythritol and a Jan. 2, 1951     A. E. RHEINECK     2,536,660
NITROCELLULOSE COMPATIBLE PENTAERYTHRITOL ESTERS Filed May 13, 1950

ALFRED E. RHEINECK
INVENTOR.

BY Ernest G. Peterson

AGENT